(12) United States Patent
De-Gol (10) Patent No.: US 9,372,484 B2
(45) Date of Patent: Jun. 21, 2016

(54) AUTOMATED GUIDED VEHICLES

(71) Applicant: Robocoaster Limited, Leamington Spa, Warwickshire (GB)

(72) Inventor: Gino Daniel De-Gol, Heathcote (GB)

(73) Assignee: RoboCoaster Limited (GB)

( * ) Notice: Subject to any disclaimer, the term of this patent is extended or adjusted under 35 U.S.C. 154(b) by 0 days.

(21) Appl. No.: 14/288,123

(22) Filed: May 27, 2014

(65) Prior Publication Data

US 2014/0358330 A1    Dec. 4, 2014

(30) Foreign Application Priority Data

May 28, 2013 (GB) .................................. 1309488.3
Nov. 19, 2013 (GB) .................................. 1320389.8

(51) Int. Cl.
*G09G 5/00*     (2006.01)
*G05D 1/02*     (2006.01)
*A63G 31/16*    (2006.01)

(52) U.S. Cl.
CPC .............. *G05D 1/0265* (2013.01); *A63G 31/16* (2013.01); *G05D 1/0214* (2013.01)

(58) Field of Classification Search
CPC ... G05D 1/0214; G05D 1/0265; G05D 1/021; A63G 15/00; A63G 31/02; G63G 31/16
USPC .............................................. 701/2; 345/2.3
See application file for complete search history.

(56) References Cited

U.S. PATENT DOCUMENTS

| | | | |
|---|---|---|---|
| 3,033,305 A | 5/1962 | Harned et al. | |
| 3,768,586 A * | 10/1973 | Thompson | G05D 1/0272 180/168 |
| 3,993,156 A | 11/1976 | Rubel | |
| 4,855,656 A | 8/1989 | Saitoh et al. | |
| 2010/0053029 A1* | 3/2010 | Wilzbach | A63G 7/00 345/2.3 |
| 2010/0185353 A1* | 7/2010 | Barwick | B60K 17/30 701/23 |
| 2013/0274985 A1* | 10/2013 | Lee | B60W 10/20 701/23 |

FOREIGN PATENT DOCUMENTS

| | | |
|---|---|---|
| EP | 0226386 A2 | 6/1987 |
| EP | 0614134 A1 | 9/1994 |
| FR | 2301860 A1 | 9/1976 |
| WO | 0195989 A1 | 12/2001 |

OTHER PUBLICATIONS

International Search Report, dated Nov. 17, 2014, from corresponding International Application No. PCT/GB2014/051573.
Written Opinion of the International Searching Authority, dated Nov. 17, 2014, from corresponding International Application No. PCT/GB2014/051573.
International Preliminary Report on Patentability, dated Dec. 10, 2015, from corresponding International Application No. PCT/GB2014/051573.

* cited by examiner

*Primary Examiner* — Adam Tissot
(74) *Attorney, Agent, or Firm* — Brient Globerman, LLC; Kyle M. Globerman (57) ABSTRACT

The present invention relates to automated guided vehicles, hereinafter referred to as AGVs, and specifically to AGVs used for entertainment purposes. More specifically, the present invention relates to a safety system for a passenger carrying AGV used for entertainment purposes. The present invention acts to prevent a passenger carrying automated guided vehicle from deviating from its intended path.

22 Claims, 5 Drawing Sheets

AUTOMATED GUIDED VEHICLES

CLAIM OF PRIORITY

This application claims priority to foreign Application Serial No. GB 1309488.3, filed May 28, 2013, and also claims priority to foreign Application Serial No. GB1320389.8, filed Nov. 19, 2013, the entire disclosures of which are incorporated by reference herein.

BACKGROUND

The present invention relates to automated guided vehicles, hereinafter referred to as AGVs, and specifically to AGVs used for entertainment purposes. More specifically, the present invention relates to safety systems for a passenger carrying AGV, used for entertainment purposes.

Theme park rides typically utilise passenger carrying AGVs to provide an immersive entertainment experience. The AGV moves through a themed environment and its movement is synchronised with elements of the themed environment. Such elements may include, for example, scenery, props, animatronics, audio effects, visual effects, pyrotechnic effects and olfactory effects. So as to provide maximum passenger enjoyment, the movement of the AGV is synchronised very closely with the themed environment elements. As such, it is important that the AGV does not deviate from its intended path while moving through the themed environment.

So as to increase passenger enjoyment, there is a need from designers of immersive entertainment experiences to include more dynamic movement sequences of the AGV. For example, the AGV may be required to undergo periods of rapid acceleration and deceleration, to perform tight turns, to rotate on the spot, and to transition into reverse movement. Such movements may be undertaken in isolation or combination. The intention is to provide the passengers with an experience that they may perceive includes an element of danger, however it is imperative for passenger safety that all movements are conducted in a controlled manner.

SUMMARY OF THE INVENTION

According to a first aspect of the present invention there is provided a safety system for a passenger carrying automated guided vehicle used for entertainment purposes, the automated guided vehicle further being operable to follow a path defined by a radio signal broadcasting guidance wire embedded in a floor or surface over which the automated guided vehicle is intended to travel, the automated guided vehicle further being operable to execute one or more dynamic movement operations while following said path including, but not limited to lateral translation movements, spins, helical spins, slides in or contrary to the direction of movement of the vehicle, periods of rapid acceleration and deceleration or combinations of the foregoing, wherein the safety system includes a sensor operable to detect the radio signal broadcast by the guidance wire and a controller, wherein the controller has a first output which is generated when the sensor is able to detect the radio signal and a second output which is generated instead of the first output when the sensor is unable to detect the radio signal broadcast by the wire, wherein further the second output causes the automated guided vehicle to stop.

The present invention provides a safety system for a wire guided passenger carrying AGV which causes the AGV to stop in the event that it deviates from its intended path, for example during or after executing a dynamic movement operation.

The sensor of the safety system may comprise a ring antenna. In such an embodiment, the safety system ring antenna may be provided concentrically within a ring antenna used for guiding the automated guided vehicle along its intended path and/or synchronising movement of the automated guided vehicle with aspects of the environment through which is intended to travel.

Alternatively, the safety sensor may be provided on a rotatable body of the automated guided vehicle. In such an embodiment, it will be appreciated that by virtue of the rotatable body a ring antenna is not necessary. In such an embodiment the safety sensor may comprise a forward sensor element and a rearward sensor element. The rotatable body may further include an odometry sensor. A rotational position sensor may be associated with the rotatable body.

The automated guided vehicle may further include a peripheral sensor arrangement which is operable to determine if the periphery of the automated guided vehicle moves to a position outside of the normal operating parameters for the vehicle and thereafter cause the vehicle to stop. The peripheral sensor may comprise an antenna which extends around the periphery of the vehicle and which is operable to detect a radio signal broadcasting limit defining wire embedded in a floor or surface over which the automated guided vehicle is intended to travel, the peripheral sensor being operable to stop the operation of the vehicle in the event that the radio signal from the embedded limit defining wire is detected.

The peripheral sensor arrangement provides an additional layer of safety to the operation of a passenger carrying AGV in an entertainment environment. The peripheral sensor arrangement operates to stop the operation of the AGV in the event that a portion of the periphery of the AGV is positioned at or beyond a predetermined location during operation of the AGV even though the AGV may still be correctly located with reference to the guidance wire. The peripheral sensor arrangement may stop the operation of the AGV in the event that the AGV rotates beyond a predetermined location during or after a dynamic movement operation.

The safety system further includes first and second radio signal broadcasting limit defining wires embedded in a floor over which the automated guided vehicle is intended to travel, the limit defining wires being provided on opposing sides of the guidance wire. In various embodiments, at least one of the first and second limit defining wires may be spaced a constant distance from the guidance wire along the length of the guidance wire. In other embodiments, both the first and second limit defining wires may be spaced a constant distance from the guidance wire along the length of the guidance wire.

Alternatively, at least one of the first and second limit defining wires may be spaced at a varying distance from the guidance wire along the length of the guidance wire. In still other embodiments, both the first and second limit defining wires may be spaced a varying distance from the guidance wire along the length of the guidance wire.

According to a second aspect of the present invention there is provided a passenger carrying automated guided vehicle including the safety system described with reference to the first aspect.

According to a third aspect of the present invention there is provided a method for disabling the operation of a passenger carrying automated guided vehicle in the event that it deviates from an intended travel path. In various embodiments, the method comprises the steps of (1) providing a passenger carrying automated guided vehicle having a safety sensor and a safety controller, the safety sensor and safety controller being separate to guidance sensors and movement controllers of the vehicle, the automated guided vehicle further being operable to execute one or more dynamic movement operations while following said path including, but not limited to lateral translation movements, spins, helical spins, slides in or contrary to the direction of movement of the vehicle, periods of rapid acceleration and deceleration, and combinations of the foregoing, (2) providing a radio signal broadcasting guidance wire embedded in a surface over which the passenger carrying automated guided vehicle is intended to travel, (3) operating the passenger carrying automated guided vehicle so that it follows a path defined by the radio signal broadcasting wire, and (4) causing the safety controller to stop the vehicle in the event that the safety sensor is no longer able to detect the radio signal broadcast by the wire.

In various embodiments, the method may further comprise the step of providing peripheral sensor comprising an antenna which extends around the periphery of the vehicle and which is operable to detect a radio signal broadcasting limit defining wire embedded in a floor over which the automated guided vehicle is intended to travel, the peripheral sensor being operable to stop the operation of the vehicle in the event that the a radio signal from the embedded limit defining wire is detected.

According to a fourth aspect of the present invention there is provided a safety system for a passenger carrying automated guided vehicle used for entertainment purposes, the automated guided vehicle being operable to follow a path over a floor or surface which the automated guided vehicle is intended to travel, the automated guided vehicle further being operable to execute one or more dynamic movement operations while following said path including, but not limited to lateral translation movements, spins, helical spins, slides in or contrary to the direction of movement of the vehicle, periods of rapid acceleration and deceleration, and combinations of the foregoing, wherein the safety system includes a peripheral sensor comprising an antenna which extends around the periphery of the vehicle and which is operable to detect a radio signal broadcasting limit defining wire embedded in a floor over which the automated guided vehicle is intended to travel, the peripheral sensor being operable to stop the operation of the vehicle in the event that the a radio signal from the embedded limit defining wire is detected.

The peripheral sensor arrangement provides a safety system for the operation of a passenger carrying AGV in an entertainment environment. The peripheral sensor arrangement operates to stop the operation of the AGV in the event that a portion of the periphery of the AGV is placed at or beyond a predetermined location during operation of the AGV even though the AGV may still be correctly located on its intended travel path as determined by the AGV guidance system. The peripheral sensor arrangement may stop the operation of the AGV in the event that the AGV, for example, rotates beyond a predetermined location during or after a dynamic movement operation.

The safety system may further include first and second radio signal broadcasting limit defining wires embedded in a floor over which the automated guided vehicle is intended to travel, the limit defining wires being provided on opposing sides of the travel path. In various embodiments, the first and second limit defining wires may be spaced a constant distance from one another along the length of the travel path. Alternatively, in other embodiments, the first and second limit defining wires may be spaced at a varying distance from one another along the length of the travel path.

According to a fifth aspect of the present invention there is provided a passenger carrying automated guided vehicle including the safety system described with reference to the fourth aspect.

According to a sixth aspect of the present invention there is provided a method disabling the operation of a passenger carrying automated guided vehicle in the event that an edge of the vehicle deviates a predetermined distance from an intended travel path of the vehicle, the method comprising the steps of (1) providing a passenger carrying automated guided vehicle having a safety sensor and a safety controller, the safety sensor and safety controller being separate to guidance sensors and movement controllers of the vehicle, the automated guided vehicle further being operable to execute one or more dynamic movement operations while following said path including, but not limited to lateral translation movements, spins, helical spins, slides in or contrary to the direction of movement of the vehicle, periods of rapid acceleration and deceleration, and combinations of the forgoing, the safety sensor being a peripheral sensor comprising an antenna which extends around the periphery of the vehicle and which is operable to detect a radio signal broadcasting limit defining wire embedded in a floor over which the automated guided vehicle is intended to travel, (2) providing a radio signal broadcasting limit defining wire embedded in a surface over which the passenger carrying automated guided vehicle is intended to travel, (3) operating the passenger carrying automated guided vehicle so that it follows an intended travel path, and (4) causing the safety controller to stop the vehicle in the event that the peripheral sensor detects a radio signal broadcast by the limit defining wire.

In various embodiments, first and second limit defining wires may be provided on opposing sides of the intended travel path of the vehicle.

BRIEF DESCRIPTION OF THE DRAWINGS

Embodiments of the present system will be described with reference to the accompanying drawings in which.

DETAILED DESCRIPTION

Figure 1:
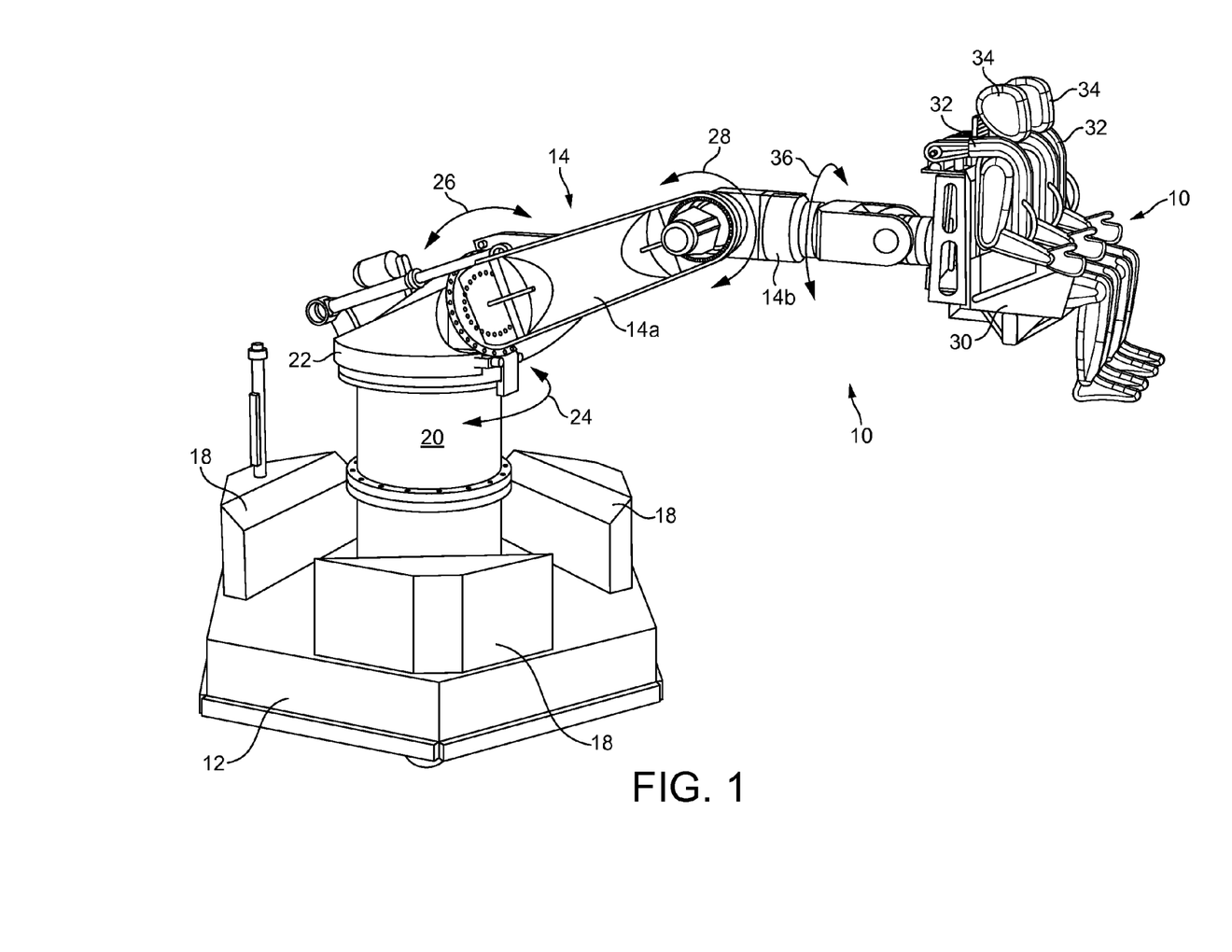
FIG. 1 shows a perspective view of a passenger carrying AGV.

Referring firstly to FIG. 1, there is shown an automated guided vehicle, hereinafter referred to as an AGV, generally designated 10. In the embodiment shown, the AGV includes a base 12, an arm 14 and a passenger module 16. The configuration of the AGV 10 is shown by way of example only and is not intended to be limiting.

The base 12 includes a number of drive units which enable the AGV 10 follow an intended path. In the embodiment shown the drive units are located in triangular projections 18 of the base 12. The base 12 further includes a central pillar 20 to which a turntable 22 of the arm 14 is rotatably mounted. The arm 14 includes a lower arm portion 14a and an upper arm portion 14b which are pivotably connected to one another. The lower arm portion 14a is further pivotably connected to the turntable 22. The pivotable connection between of the arm portions 14a and 14b, and between the lower arm portion 14a and the turntable 22, together with the rotatable connection of the arm 14 to the pillar 20 enables the arm 14 to move in a plurality of directions as indicated by arrows 24, 26 and 28.

In the embodiment shown, the passenger module 16 is provided with a pair of seats 30 mounted in a side by side orientation. Each seat 30 is provided with a rigid harness 32 which ensures that an occupant 34 remains in the seat 30 when the passenger module 16 is moved by the arm 14 and further when the arm 14 and passenger module 16 are moved by the base 12. The passenger module 16 is pivotably connected to the upper arm portion 14b and is movable relative to the arm 14 as indicated by arrow 36. It will be appreciated that the passenger carrying arrangement of the AGV 10 described above is illustrative of one of many different passenger carrying arrangements that may be utilised by an AGV 10 used for entertainment purposes. For example, the seats 30 may be mounted to the base 12 of the AGV 10 and the arm 14 omitted.

Passenger carrying AGVs 10 of the type described above are typically used in a theme parks to provide passengers with an immersive entertainment experience. The AGVs typically move through a themed environment relating to, for example, a film or video game. The themed environment may include such elements as scenery, props, animatronics, audio effects, visual effects, pyrotechnic effects and olfactory effects. The aforementioned elements are provided by way of example only and are not intended to be limiting. As the AGV 10 moves through the themed environment its movement, as well as the movement of the arm 14 and passenger module 16, is synchronised with the themed environment elements to provide the immersive entertainment experience. As will be described in greater detail below, it is very important that the AGV 10 does not deviate from an intended path through the themed environment.

Figure 2:
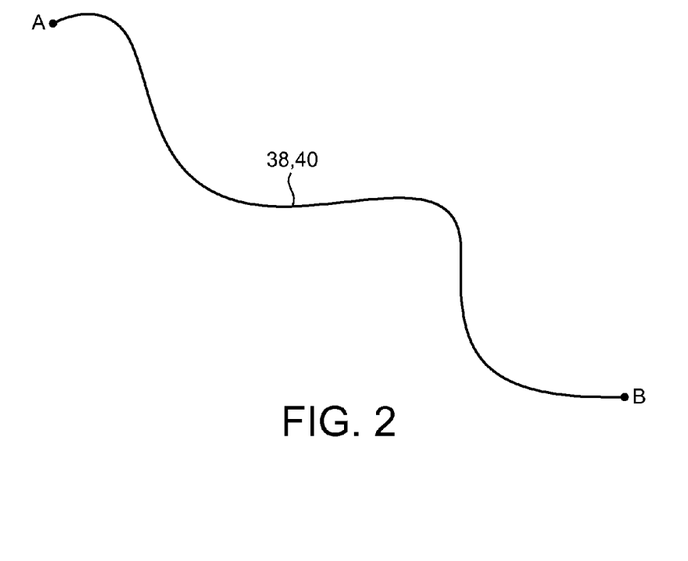
FIG. 2 shows a schematic view of a path for such an AGV.

FIG. 2 shows a schematic view of a travel path, generally designated 38 for the AGV 10. The travel path 38 has a start point A and an end point B and extends in a sinuous manner between the start and endpoints A,B. In a typical themed environment the travel path 38 is in the form of a closed loop such that the AGVs circulate around the travel path 38. The start point A may be defined by the passenger embarkation point of the path 38, whereas the end point B may be defined by the passenger disembarkation point of the path 38. The travel path 38 may be defined in the themed environment by a guidance wire which is embedded in the floor of the environment. A transmitter is connected to the wire such that a radio signal of a predetermined frequency is broadcast from the wire. The AGV 10 is provided with an appropriate sensor which is able to detect the radio signal. Markers are typically provided in the floor to assist the AGV 10 in determining its position on the travel path 38.

Typically, the AGV 10 is configured to travel for the majority of the path 38 between start point A and end point B at a steady rate. At predetermined points along the travel path 38 the AGV 10 may undertake a dynamic movement operation. Such dynamic movement operations include, for example, lateral translation movements, spins, helical spins, slides in or contrary to the direction of movement of the vehicle, periods of rapid acceleration and deceleration, transitions into reverse, sharp turns or combinations of the foregoing.

Figure 3:
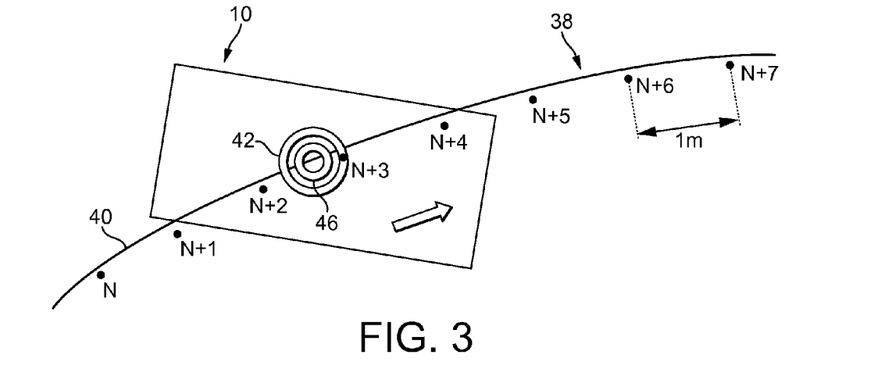
FIG. 3 shows a schematic top plan view of an AGV following the path of FIG. 2.
Figure 4:
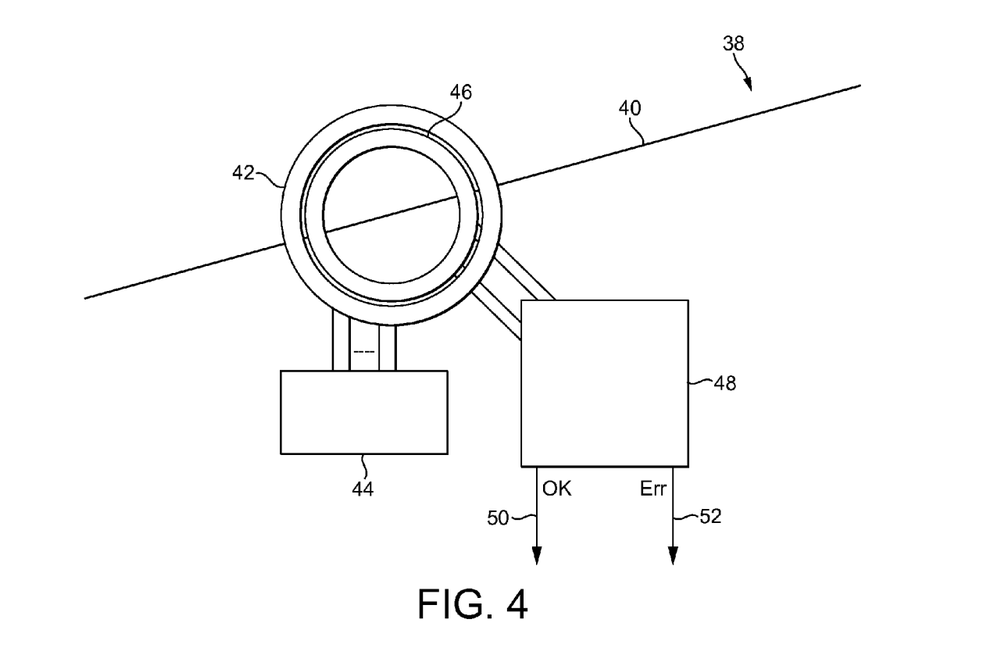
FIG. 4 shows a schematic view of a guidance and safety arrangement for the AGV.

FIGS. 3 and 4 show more detailed views of an AGV 10 and the travel path 38. Looking firstly at FIG. 3, the wire defining a section of the travel path 38 is identified by reference number 40. A plurality of markers indicated by references N and N+1 to N+7. The markers are positioned close to the wire 40 and, in the embodiment shown, are spaced at one meter intervals. The markers may be defined by RFD elements that are embedded in the floor of the themed environment. The AGV 10 is provided with a guidance sensor 42 which detects both the wire 38 and the RFID tags.

In use, the guidance sensor 42 determines that the AGV 10 is on the intended travel path 38 by sensing the radio signal emanating from the wire 40. The guidance sensor 42 further determines the position of the AGV 10 along the travel path 38 by detecting the RFID tags. The guidance sensor 42 is connected to a movement controller (shown as item 44 in FIG. 4) of the AGV 10 which, depending upon the location of the AGV 10 along the intended travel path 38, causes the AGV base 12, arm 14 and passenger module 16 to be moved in desired manner. In the embodiment shown, the sensor 42 takes the form of a ring antenna.

In order to provide the AGV passengers with the desired immersive entertainment experience the movement of the AGV base 12, arm 14 and passenger module 16 are synchronised very closely with the aforementioned elements of the themed environment. It is thus of utmost importance that the AGV 10 does not deviate from its intended travel path 38 so as not to diminish the experience of the passengers or to potentially endanger the passengers by inadvertently contacting one or more elements of the themed environment. So as to ensure that the AGV 10 does not continue to act under the instruction of the movement controller 44 if the AGV deviates from the intended travel path 38, the AGV 10 is provided with a safety sensor generally designated 46. The safety sensor 46 takes the form of a ring antenna having a smaller diameter than that of the guidance sensor 42. The safety sensor 46 is located within the space provided in the centre of the guidance sensor 42. The guidance and safety sensors 42,46 are concentric.

The safety sensor 46 is connected to a safety controller 48 having two output channels 50,52. The output channels comprise an OK channel 50 and an ERROR channel 52. When the safety sensor 46 is able to detect the radio signal emanating from the wire 40 by virtue of being positioned over the wire 40, the safety controller 48 provides an OK output to the OK channel 50. This output enables the movement controller 44 to operate the AGV base 12, arm 14 and passenger module 16 in the desired manner to synchronise with the themed environment. In the event that the safety sensor 46 is no longer able to detect the radio signal emanating from the wire 40, then the safety controller 48 provides an ERROR output to the ERROR channel 52. The ERROR output overrides the movement controller 44 and causes the AGV 10 to stop. Loss of the radio signal by the safety sensor 46 may be due to a number of factors including, for example, the AGV moving to a location where the safety sensor 46 is no longer positioned over the wire 40 or the wire 40 breaking.

Figure 6:
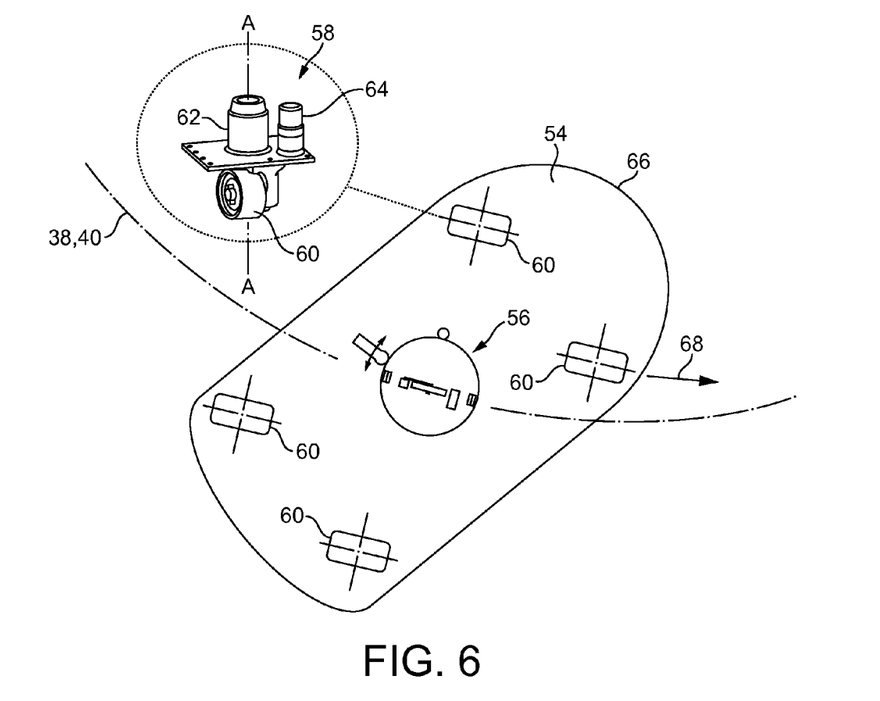
FIG. 6 shows a schematic top plan view of the steerable antenna array and an AGV.

Referring now to FIG. 6 there is shown an alternative embodiment of an AGV, generally designated 54, having a steerable guidance and safety antenna array, generally designated 56. Features common to the embodiment described with reference to FIGS. 1 to 4 are identified with like reference numerals.

As before, the AGV 54 is intended to follow a path 38 defined by an embedded wire 40. The AGV 54 is provided with a plurality of combined drive and steering units 58. Each unit 58 includes a ground engaging wheel 60, a drive motor 62 and a steering actuator 64. The drive motor 62 is operable to rotate the wheel 60 to effect movement of the AGV 54. The steering actuator 64 is operable to pivot the wheel about a steering axis A-A so as to effect steering of the AGV 54. In the embodiment shown, the AGV 54 is provided with four drive and steering units 58. Each unit 58 is independently operable. As can be seen in FIG. 6, the drive and steering units 58 can be operated such that the front 66 of the AGV 54 can point in different direction to the direction of travel 68 of the AGV 54.

Figure 5:
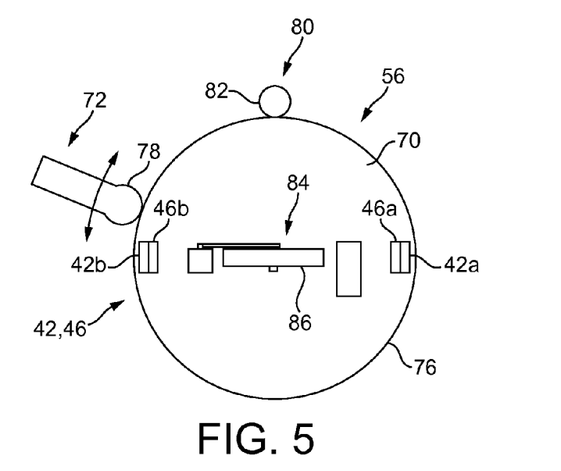
FIG. 5 shows a schematic top plan view of a steerable antenna array.

FIG. 5 shows a steerable guidance and safety antenna array 56. The array 56 includes a rotatable body 70. In use, the rotatable body 70 is mounted for rotation in the AGV 54. The array 56 is provided with a drive arrangement 72 operable to rotate the array 70 relative to the AGV 54. The rotatable body 70 may be provided with a substantially circular periphery 76. In such an embodiment, the drive arrangement 72 may be provided with a drive roller 78 which is in frictional engagement with the circular periphery 76. The array 56 is further provided with an orientation sensor 80 which is operable to determine the rotational position of the array 56 relative to the AGV 54. In the embodiment shown the orientation sensor 80 includes a roller 82, in frictional engagement with the circular periphery 76.

The rotatable body 70 includes an odometry sensor 84. In the embodiment shown, the odometry sensor 84 includes a ground engaging wheel 86. The rotatable body further includes a guidance sensor 42 and a safety sensor 46. Instead of being concentric ring sensors, the guidance and safety sensors 42,46 each comprise a forward sensor 42a,46a and a rearward sensor 42b,46b. The sensors 42a,42b,46a,46b are arranged on the rotatable body 70 in forward and rearward pairs such that the safety sensors 46a,46b are positioned closer to the rotational axis 88 of the rotatable body 70 than the guidance sensors 46a,46b. This mirrors the arrangement of the concentric ring sensors described above wherein the safety sensor 46 is located within the space provided in the centre of the guidance sensor 42.

Figure 7A:
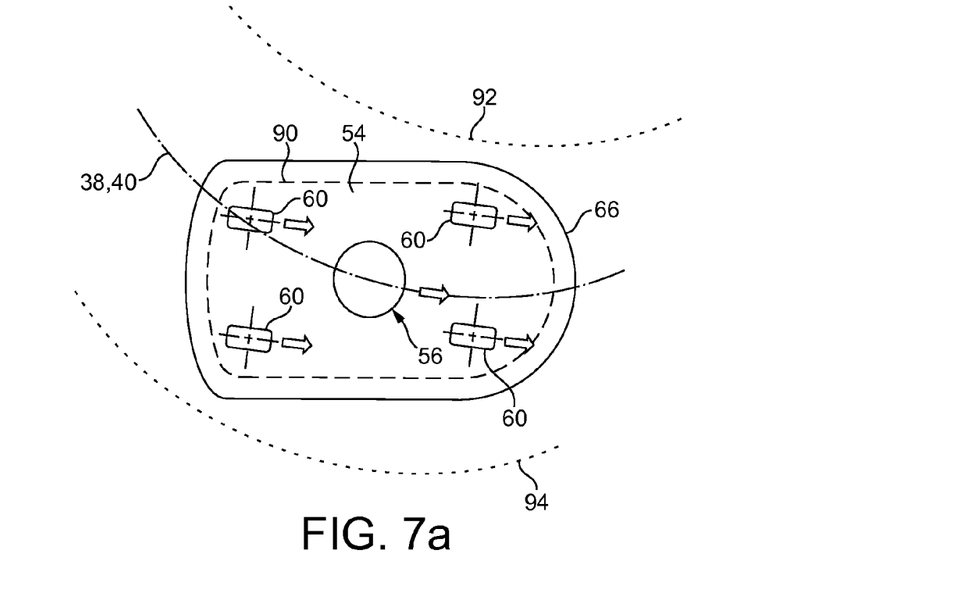
FIGS. 7a and 7b show schematic top plan views of an AGV having a peripheral safety antenna.
Figure 7B:
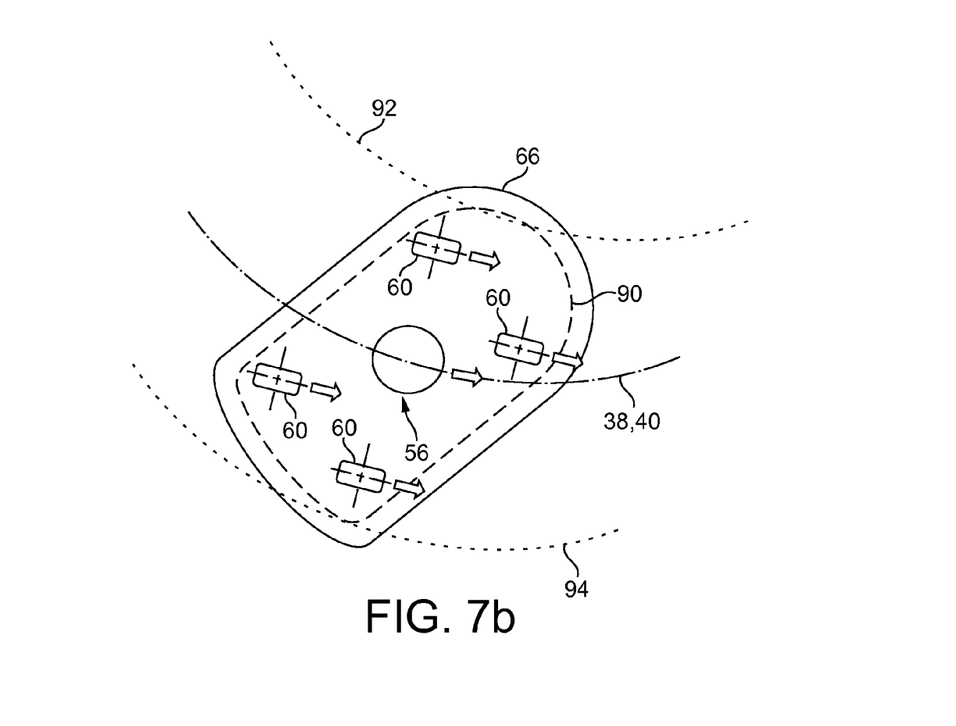

FIGS. 7a and 7b show an AGV 54 including a peripheral safety antenna 90. Features of the AGV 54 common to that described with reference to FIGS. 5 and 6 are identified with like reference numerals. The safety antenna 90 of FIGS. 7a and 7b may be used in conjunction with the safety sensor system of FIGS. 1 to 4. The safety antenna 90 is provided around the periphery of the AGV 54 and corresponds to the external shape of the AGV 54. The surface over which the AGV 54 is intended to travel is provided with a guidance wire 40. The surface is further provided with inner and outer safety or limit defining wires 92,94 provided on opposing sides of the guidance wire 40. The safety wires 92,94 may be have a substantially constant spacing from the guidance wire along its length. Alternatively, one or both safety wires 92, 94 may have varying spacing from the guidance wire along its length.

During normal operation of the AGV 54, the AGV is positioned such that the safety antenna 90 does not overlie either the inner or the outer safety wires 92, 94. This is shown in FIG. 7a. In the event that the AGV 54 rotates, for example during a dynamic movement operation, to such an extent that the antenna 90 overlies one or both of the safety wires 92,94, then the antenna 90 will detect the or each wire 92,94. In such an instance operation of the AGV may be halted to ensure the safety of the AGV passengers.

In an alternative embodiment, the safety antenna 90 is configured to detect the proximity of one or both safety wires 92,94.

The safety wires 92,94 may extend fully along the intended path of the AGV 54 from its start point to its end point. Alternatively, safety wires may only be provided in the proximity of features of the themed environment through which the AGV 54 is intended to travel and which the AGV is to be prevented from contacting and/or approaching too closely.

The peripheral safety antenna 90 provides an additional safety system which operates, for example, in the event that the AGV 54 remains located on the guidance wire, but rotates beyond a predetermined limit as the result of undertaking a dynamic movement operation of the type described above.

In the above described embodiment, the safety wires 92,94 and safety antenna 90 are utilised in conjunction with an AGV guided by an embedded wire. It will however be appreciated that the safety wire and peripheral antenna arrangement 90, 92, 94 may be used in conjunction with AGVs having alternative guidance arrangements. For example, the AGV may be provided with an ultra-wideband radio ranging system which works in conjunction with inertial sensors. Alternatively, the AGV may for example be provided with magnetic or coloured guide tape navigation system, a laser guidance navigation system.

What is claimed is:

1. A method for disabling the operation of a passenger carrying automated guided vehicle in the event that it deviates from an intended travel path comprising the steps of:
    providing a passenger carrying automated guided vehicle having a safety sensor and a safety controller, the safety sensor and safety controller being separate to guidance sensors and movement controllers of the vehicle, the automated guided vehicle further being operable to execute one or more dynamic movement operations while following the intended travel path including, but not limited to lateral translation movements, spins, helical spins, slides in or contrary to the direction of movement of the vehicle, periods of rapid acceleration and deceleration, and combinations of the foregoing, wherein the safety sensor further comprises a ring antenna positioned concentrically within a ring antenna used for guiding the automated guided vehicle along its intended path and/or synchronizing movement of the automated guided vehicle with aspects of the environment through which it is intended to travel;
    providing a radio signal broadcasting guidance wire embedded in a surface over which the passenger carrying automated guided vehicle is intended to travel;
    operating the passenger carrying automated guided vehicle so that it follows a path defined by the radio signal broadcasting wire; and
    causing the safety controller to stop the vehicle in the event that the safety sensor is no longer able to detect the radio signal broadcast by the wire.

2. The method as claimed in claim 1 and further comprising the step of:
    providing a peripheral sensor comprising an antenna which extends around the periphery of the vehicle and which is operable to detect a radio signal broadcasting limit defining wire embedded in a floor over which the automated guided vehicle is intended to travel, the peripheral sensor being operable to stop the operation of the vehicle in the event that the a radio signal horn the embedded limit defining wire is detected.

3. A safety system for a passenger carrying automated guided vehicle used for entertainment purposes, the automated guided vehicle further being operable to follow a path defined by a radio signal broadcasting guidance wire embedded in a floor over which the automated guided vehicle is intended to travel, the automated guided vehicle further being operable to execute one or more dynamic movement operations while following said path, wherein the safety system includes a sensor operable to detect the radio signal broadcast by the wire and a controller, wherein the controller has a first output which is generated when the sensor is able to detect the radio signal and a second output which is generated instead of the first output when the sensor is unable to detect the radio signal broadcast by the wire, wherein further the second output causes the automated guided vehicle to stop, wherein the sensor of the safety system comprises a ring antenna, and the safety system ring antenna is provided concentrically within a ring antenna used for guiding the automated guided vehicle along its intended path and/or synchronizing movement of the automated guided vehicle with aspects of the environment through which it is intended to travel.

4. The safety system as claimed in claim 3 wherein the automated guided vehicle further comprises a peripheral sensor arrangement which is operable to determine if the periphery of the automated guided vehicle moves to a position outside of the normal operating parameters for the vehicle and thereafter cause the vehicle to stop.

5. The safety system as claimed in claim 4 wherein the peripheral sensor comprises an antenna which extends around the periphery of the vehicle and which is operable to detect a radio signal broadcasting limit defining wire embedded in a floor over which the automated guided vehicle is intended to travel, the peripheral sensor being operable to stop the operation of the vehicle in the event that the radio signal from the embedded limit defining wire is detected.

6. The safety system as claimed in claim 5 wherein the safety system further includes first and second radio signal broadcasting limit defining wires embedded in a floor over which the automated guided vehicle is intended to travel and provided on opposing sides of the guidance wire.

7. The safety system as claimed in claim 6 wherein at least one of the first and second limit defining wires is spaced a constant distance from the guidance wire along the length of the guidance wire.

8. The safety system as claimed in claim 7 wherein both the first and second limit defining wires are spaced a constant distance from the guidance wire along the length of the guidance wire.

9. The safety system as claimed in claim 6 wherein at least one of the first and second limit defining wires is spaced at a varying distance from the guidance wire along the length of the guidance wire.

10. The safety system as claimed in claim 7 wherein both the first and second limit defining wires are spaced a constant distance from the guidance wire along the length of the guidance wire.

11. The safety system as claimed in claim 3, wherein the one or more dynamic movement operations are one or more dynamic movement operations chosen from a group consisting of:
lateral translation movements;
spins;
helical spins;
slides in or contrary to the direction of movement of the vehicle; and periods of rapid acceleration and deceleration.

12. A passenger carrying automated guided vehicle including the safety system according to claim 3.

13. A safety system for a passenger carrying automated guided vehicle used for entertainment purposes, the automated guided vehicle further being operable to follow a path defined by a radio signal broadcasting guidance wire embedded in a floor over which the automated guided vehicle is intended to travel, the automated guided vehicle further being operable to execute one or more dynamic movement operations while following said path, wherein the safety system includes a sensor operable to detect the radio signal broadcast by the wire and a controller, wherein the controller has a first output which is generated when the sensor is able to detect the radio signal and a second output which is generated instead of the first output when the sensor is unable to detect the radio signal broadcast by the wire, wherein further the second output causes the automated guided vehicle to stop, wherein the safety sensor is provided on a rotatable body of the automated guided vehicle, the safety sensor comprising a forward sensor element and a rearward sensor element, wherein the rotatable body further comprises an odometry sensor, and wherein further a rotational position sensor is associated with the rotatable body.

14. The safety system as claimed in claim 13 wherein the automated guided vehicle further comprises a peripheral sensor arrangement which is operable to determine if the periphery of the automated guided vehicle moves to a position outside of the normal operating parameters for the vehicle and thereafter cause the vehicle to stop.

15. The safety system as claimed in claim 14 wherein the peripheral sensor comprises an antenna which extends around the periphery of the vehicle and which is operable to detect a radio signal broadcasting limit defining wire embedded in a floor over which the automated guided vehicle is intended to travel, the peripheral sensor being operable to stop the operation of the vehicle in the event that the radio signal from the embedded limit defining wire is detected.

16. The safety system as claimed in claim 15 wherein the safety system further includes first and second radio signal broadcasting limit defining wires embedded in a floor over which the automated guided vehicle is intended to travel and provided on opposing sides of the guidance wire.

17. The safety system as claimed in claim 16 wherein at least one of the first and second limit defining wires is spaced a constant distance from the guidance wire along the length of the guidance wire.

18. The safety system as claimed in claim 17 wherein both the first and second limit defining wires are spaced a constant distance from the guidance wire along the length of the guidance wire.

19. The safety system as claimed in claim 16 wherein at least one of the first and second limit defining wires is spaced at a varying distance from the guidance wire along the length of the guidance wire.

20. The safety system as claimed in claim 17 wherein both the first and second limit defining wires are spaced a constant distance from the guidance wire along the length of the guidance wire.

21. The safety system as claimed in claim 13, wherein the one or more dynamic movement operations are one or more dynamic movement operations chosen from a group consisting of:
lateral translation movements;
spins;
helical spins;
slides in or contrary to the direction of movement of the vehicle; and periods of rapid acceleration and deceleration.

22. A passenger carrying automated guided vehicle including the safety system according to claim 21.

* * * * *